(12) United States Patent
Berkeland et al.

(10) Patent No.: US 7,461,126 B2
(45) Date of Patent: Dec. 2, 2008

(54) SYSTEM AND METHOD FOR DISTRIBUTED MULTIPOINT CONFERENCING WITH AUTOMATIC ENDPOINT ADDRESS DETECTION AND DYNAMIC ENDPOINT-SERVER ALLOCATION

(75) Inventors: Mark Steven Berkeland, San Jose, CA (US); Farhang Frank Mehr, Nashua, NH (US); Richard Bruce Kennerly, Amherst, NH (US); Brian Wesley Ashford, Dover, NH (US); David Omar Bundy, Bedford, NH (US)

(73) Assignee: Radvision Ltd., Tel Aviv (IL)

( * ) Notice: Subject to any disclaimer, the term of this patent is extended or adjusted under 35 U.S.C. 154(b) by 543 days.

(21) Appl. No.: 10/697,190

(22) Filed: Oct. 30, 2003

(65) Prior Publication Data

US 2005/0108328 A1 May 19, 2005

(51) Int. Cl.
*G06F 15/16* (2006.01)
(52) U.S. Cl. ................ 709/204; 709/203; 709/204; 370/260; 370/263
(58) Field of Classification Search ......... 709/203–205, 709/245; 370/260–264, 351–356
See application file for complete search history.

(56) References Cited

U.S. PATENT DOCUMENTS

| | | | | |
|---|---|---|---|---|
| 5,625,407 A | * | 4/1997 | Biggs et al. ................ | 370/260 |
| 5,916,302 A | * | 6/1999 | Dunn et al. ................ | 709/204 |
| 6,343,313 B1 | * | 1/2002 | Salesky et al. ............. | 709/204 |
| 6,577,622 B1 | * | 6/2003 | Schuster et al. ............ | 370/352 |
| 6,590,604 B1 | * | 7/2003 | Tucker et al. .............. | 709/204 |
| 6,728,784 B1 | * | 4/2004 | Mattaway ................... | 709/245 |
| 6,760,749 B1 | * | 7/2004 | Dunlap et al. .............. | 709/204 |
| 6,976,055 B1 | * | 12/2005 | Shaffer et al. ............. | 709/204 |
| 7,039,040 B1 | * | 5/2006 | Burg ......................... | 370/260 |
| 7,069,298 B2 | * | 6/2006 | Zhu et al. .................. | 709/204 |
| 7,158,534 B2 | * | 1/2007 | Tam et al. .................. | 709/203 |
| 7,237,004 B2 | * | 6/2007 | Slobodin et al. ........... | 709/204 |

* cited by examiner

*Primary Examiner*—Bharat N Barot
(74) *Attorney, Agent, or Firm*—Byrne Poh LLP

(57) ABSTRACT

An embodiment of the invention is a multipoint conferencing system having the ability to dynamically assign an endpoint to a "closest" one of multiple conference servers is disclosed. In one embodiment, when an endpoint first connects to the conferencing system, its Endpoint ID (e.g., IP address, E164 address) is determined. Based on the Endpoint ID, the conferencing system selects the most appropriate ones of the conference servers to act as the endpoint's "local" conference server. That is, the endpoint will transmit and receive conference data from other endpoints via the selected conference server. If no other endpoints across the network happen to be viewing a particular endpoint's video stream, the stream is not provided to the network, thus conserving network bandwidth. An embodiment further creates appropriate linking between conference servers automatically, manages conference server topology and determines link type (e.g., Unicast vs. Multicast linking) automatically.

44 Claims, 4 Drawing Sheets

| Conference Server ID | Conference Server IP address | Endpoint IP Address Range | Endpoint E164 Prefixes |
|---|---|---|---|
| ConfServA | 125.254.0.1 | 10.0.0.0 to 10.255.255.255 | 408 |
| | | | 415 |
| ... | ... | ... | ... |
| ConfServB | 60.60.60.1 | 10.20.0.0 to 125.255.0.0 | 617 |
| | | | 212 |
| ... | ... | ... | ... |
| ConfServC | 121.254.60.1 | 192.0.0.0 to 255.255.255.255 | 852 |
| ... | ... | ... | ... |

Fig. 3

| Conference ID | Conference Server ID |
|---|---|
| Conf_X | ConfServA |
| Conf_X | ConfServA |
| Conf_Y | ConfServA |
| Conf_Y | ConfServB |
| Conf_Y | ConfServB |
| Conf_Z | ConfServC |
| Conf_Z | ConfServC |
| Conf_Z | ConfServC |
| ... | ... |

Fig. 4

SYSTEM AND METHOD FOR DISTRIBUTED MULTIPOINT CONFERENCING WITH AUTOMATIC ENDPOINT ADDRESS DETECTION AND DYNAMIC ENDPOINT-SERVER ALLOCATION

FIELD OF THE INVENTION

The invention relates generally to the field of multipoint conferencing systems and more specifically to a distributed multipoint conferencing system having multiple conference servers.

BACKGROUND OF THE INVENTION

Circuit-switched video-conferencing systems over ISDN connections, which are based on the H.320 standard, became available in the early 1990's. Since then, large corporations have invested large sums of money in such video-conferencing systems and the infrastructure to support them. Executives at those companies recognized the value of meeting face-to-face with key customers, suppliers, and employees. They also recognized other benefits such as reduced travel costs, shortened decision-making cycles, and increased productivity that the costly video-conferencing systems can provide.

ISDN created great opportunities for widespread adoption of video-conferencing. But, despite the benefits of ISDN, circuit-switched video-conferencing based on the H.320 standards has seen limited deployment. Many smaller companies could not justify the expense of these costly systems and the network infrastructure needed to support them.

Advances in computer and internet technologies and video compression technologies have made it possible to integrate audio and video into the personal computing environment in which video-conferencing can be delivered on computer desktops over the same packet-based networks as more traditional LAN applications such as e-mail and file transfer. With the advent of the H.323 standard for conferencing over packet-switched networks, a new type of multipoint conferencing systems has evolved. These types of multipoint bridging units (often called Multipoint Control Units or MCUs) are cheaper than ISDN-based multipoint bridging units. Often, these packet-switched multipoint bridging units contain functionality designed to enable widespread use of multimedia communication (data, audio & video) within the enterprise. One of the most notable improvements has been the development of web-based interfaces to these devices. Today, most multipoint bridges can be configured, managed and diagnosed through a simple browser-based Graphic User Interface. Furthermore, many bridges now have added capabilities to control individual conferences, call out to multi-media endpoints, disconnect endpoints, and put the conference in lecture mode.

Many multipoint bridging units are DSP-based hardware systems, which can handle computationally intensive processes such as transcoding between different audio and video compression algorithms, rate matching, and laying out one or more continuous presence views where significant video image manipulation is required. These types of DSP-based devices meet the need for video-bridging service companies, but may be too powerful and too expensive for organizations that do not require such capabilities.

Several multipoint bridging system providers, such as First Virtual Communications of Redwood Shores, Calif., the assignee of the present invention, have developed highly sophisticated software-based conferencing servers that run on off-the-shelf personal computer platforms. The performance of these software-based conferencing servers is comparable to that of DSP-based multipoint bridging units. With the performance of existing general multi-processor systems, even the more compute intensive DSP functions can be performed in software. Because they can run on low cost personal computer platforms, the software-based solutions are significantly more cost effective. In addition to providing videoconferencing capability, First Virtual Communications' conference servers provide access to a variety of integrated rich media conferencing tools, such as instant messaging and desktop collaboration.

Because conference server software is usually licensed based on the total number of simultaneous ports utilized, enterprises can install copies of the software on multiple computers without incurring significant additional costs. The computers on which the conference software is installed can be located in remote locations and close to where clusters of endpoints are located. First Virtual Communications' conference server software utilizes a technology called Intelligent Linking in this distributed conference server environment. With Intelligent Linking, the video image from each call participant (e.g., endpoint) is sent to the local conference server. By communicating with other conference servers, each conference server is aware of which video streams are being viewed by the participants connected to that server. If no one across the network happens to be viewing a particular participant's video image, the stream is not provided to the network, thus conserving network bandwidth. Audio from local endpoints are mixed at each server and the composite audio stream is sent between each server, thus conserving bandwidth and improving CPU efficiency by minimizing the audio streams processed by each MCU.

Intelligent Linking is distinct from simple cascading, which consists of starting multipoint conferences on two or more video bridges, then connecting the conferences together by having the video bridges call one another. In simple cascading, each bridge is viewed by the other bridge(s) in the call as if it were a single endpoint. With simple cascading there is no control communication between the MCUs, each MCU will decide what audio and video is send and viewable by users on the other MCUs. The problem with simple cascading is that where there are multiple callers connected to each bridge, the remote bridge users can not select which video or audio to receive from other bridges and when traditional video mixing at the MCU (Continuous Presence). The mixed multiple images from one MCU are transmitted as one video image, which appears as miniature images within a single pane on the other MCU continuous presence. Intelligent Linking can avoid these issues. By detecting what the user (endpoint) wants, Intelligent Linking can avoid the miniature tiled panes because each server is aware of the video images to be displayed. Rather than sending pre-mixed images to other conferencing servers, Intelligent Linking allows each conference server to send and receive multiple separate video and audio streams for each endpoint and mix them locally on each conference server. For instance, each endpoint may see QCIF sized images stitched together to form a single CIF sized image instead of the mini-panes from conventional bridges. With more sophisticated endpoints, like First Virtual's Conference Client, individual video streams can be sent from each MCU to allow for any number of video images to be displayed from any MCU at the endpoint. Also, with simple cascading, audio and video are always transmitted between the MCUs, so there is no conservation of bandwidth.

In earlier generations of First Virtual Communications' distributed conference server environment, each endpoint must have a pre-assigned conference server which acts as its local server. Increasingly, conferencing endpoints are installed on mobile computers which may be used in locations "far away" from its pre-assigned conference server in terms of physical distance or in terms of the number of network hops. When an endpoint is served by a conference server across the network, effectiveness of Intelligent Linking can be significantly compromised.

In view of the foregoing, there exists a need for a distributed conference server environment where Intelligent Linking can be fully utilized regardless of whether the conference endpoints are located.

SUMMARY OF THE INVENTION

An embodiment of the invention is a multipoint conferencing system having the ability to dynamically assign an endpoint to a "closest" one of multiple conference servers. In this embodiment, when an endpoint first connects to the conferencing system, its Endpoint ID is determined. Based on the Endpoint ID, the conferencing system selects the most appropriate one of the conference servers to act as the endpoint's "local" conference server. That is, the endpoint will transmit and receive conference data from other endpoints via the selected conference server. If no one across the network happens to be viewing a particular endpoint's video stream, the stream is not provided to the network, thus conserving network bandwidth.

In one embodiment, the multipoint conferencing system includes a link manager that manages which endpoint is served by which conference server, and which endpoint is viewing which video streams or other multi-media (audio and data). Before an endpoint connects to any conference server, it first connects to the link manager. The link manager determines the Endpoint ID of the endpoint and then uses the Endpoint ID to select a most suitable one of the conference servers as the endpoint's local server. The Endpoint ID may be an IP address, or it could be an H.323 E164 address, or some other unique way of identifying the endpoint (such as SIP address domain). In particular, the link manager sets up a communication link between the endpoint and the selected conference server. In addition, the link manager sets up a communication link between the conference server and another conference server that serves other endpoints participating in the conference. These links can be established in a number of topologies, with simple two server conferencing is required, peer-to-peer Unicast links would be most appropriate. For linking for three or more servers, a Unicast hub and spoke policy could be used or Multicast links between servers would further minimize bandwidth.

In one embodiment, because the link manager can detect the endpoint addresses, the endpoints do not need to have static IP addresses. Thus, the endpoints can use dynamically allocated IP addresses. Furthermore, since the multipoint conferencing system does not need to have prior knowledge of the IP addresses of the endpoints, prior scheduling of conferences is not required. Consequently, impromptu distributed multipoint conferences involving new conference participants are possible with the present invention.

According to one embodiment, the link manager provides intelligence not only in routing endpoints but also in the paths and types of links between the conference servers. In one embodiment, the link manager intelligently sets up Unicast links or Multicast links between the conference servers. In some embodiments, a conference server may have more than one network interfaces on both sides of a firewall. In those embodiments, the link manager intelligently sets up the links between appropriate interfaces and intelligently assigns the endpoints to the appropriate interfaces.

Another embodiment of the invention is a method for setting up an impromptu multipoint conference in a distributed multipoint conferencing system. According to this embodiment, the distributed multipoint conferencing system receives a request to participate in a multipoint conference that is hosted by multiple conference servers. In response to the information carried by the request (e.g., IP address of the conference endpoint, or E164 address), the multipoint conferencing system assigns one of the conference server to be the local server for the endpoint. The multipoint conferencing system further establishes a communication link between the conference servers through which conferencing data is communicated among the participating conference endpoints.

Yet another embodiment of the invention is a computer program product for use in conjunction with a computer device. The computer program product includes a computer usable medium and a computer program mechanism embodied therein that enables the computer device to perform a method of setting up impromptu multipoint conferences in a distributed multipoint conferencing system. In particular, the computer program mechanism includes means for setting up at least one impromptu multipoint conference across multiple conference servers. Impromptu multipoint conferences can be set up across multiple conference servers even if the IP addresses of the conference endpoints are dynamically allocated.

Other aspects and advantages of the present invention will become apparent from the following detailed description, taken in conjunction with the accompanying drawings, which illustrates by way of example the principles of the invention.

BRIEF DESCRIPTION OF THE FIGURES

FIG. 3 depicts contents of a table in which the Link Manager stores IP address ranges and the associated Conference Server IDs are stored in a table (memory), in accordance with an embodiment of the invention.

FIG. 4 depicts contents of a table with which the Link Manager keeps track of which conference server is involved in which conference, in accordance with an embodiment of the invention.

Throughout the description, similar reference numbers may be used to identify similar elements.

DETAILED DESCRIPTION

As will be described in greater detail, the present invention is directed to a distributed multipoint conferencing system. A distributed multipoint conferencing system herein refers to a multipoint conferencing system that includes more than one conference server. The multipoint conferencing system is configured to detect an Endpoint Identification, or Endpoint ID of the conference endpoints. Endpoint IDs may include IP address, telephone number, or E164 address and may be dynamically allocated. Furthermore, the multipoint conferencing system is configured to allocate a most suitable conference server for the conference endpoint based on the detected Endpoint ID. As used herein, a conference endpoint (or "endpoint") may represent an audio-visual conference device having a display, an audio/video capturing capability, and an interface for connecting to a network (e.g., an IP network). An endpoint can also be a bridge or gateway to an alternate network such as ISDN or PSTN. An endpoint herein may refer to a SIP telephone or a video-phone, and the Endpoint ID of such an endpoint may be a telephone number or E164 address. An appropriately equipped personal computer, which typically includes an image capturing device, a microphone and a speaker, can function as a conference endpoint as well when appropriate software is installed. An example software that can be used is the Click to Meet Conference Client Plug-in, which is a Web browser plug-in software and which is available from First Virtual Communications of Redwood Shores, Calif. A personal computer having the necessary hardware and software implementation for internet-based videoconferencing is typically called a Web endpoint.

A conference server herein refers to software and related hardware implementation that enable video bridging along with ancillary functions such as browser based facilities to control conferences, manage data, route information, and serve web-based data flows to conference endpoints. A multipoint control unit, which enables video bridging, is considered a type of conference server, although typical multipoint control units do not provide many ancillary functions. Nevertheless, for purposes of this disclosure, the terms "conference server" and "multipoint control unit" are used interchangeably. An example conference server is the Click to Meet Conference Server suite of software, which is available from First Virtual Communications.

Figure 1:
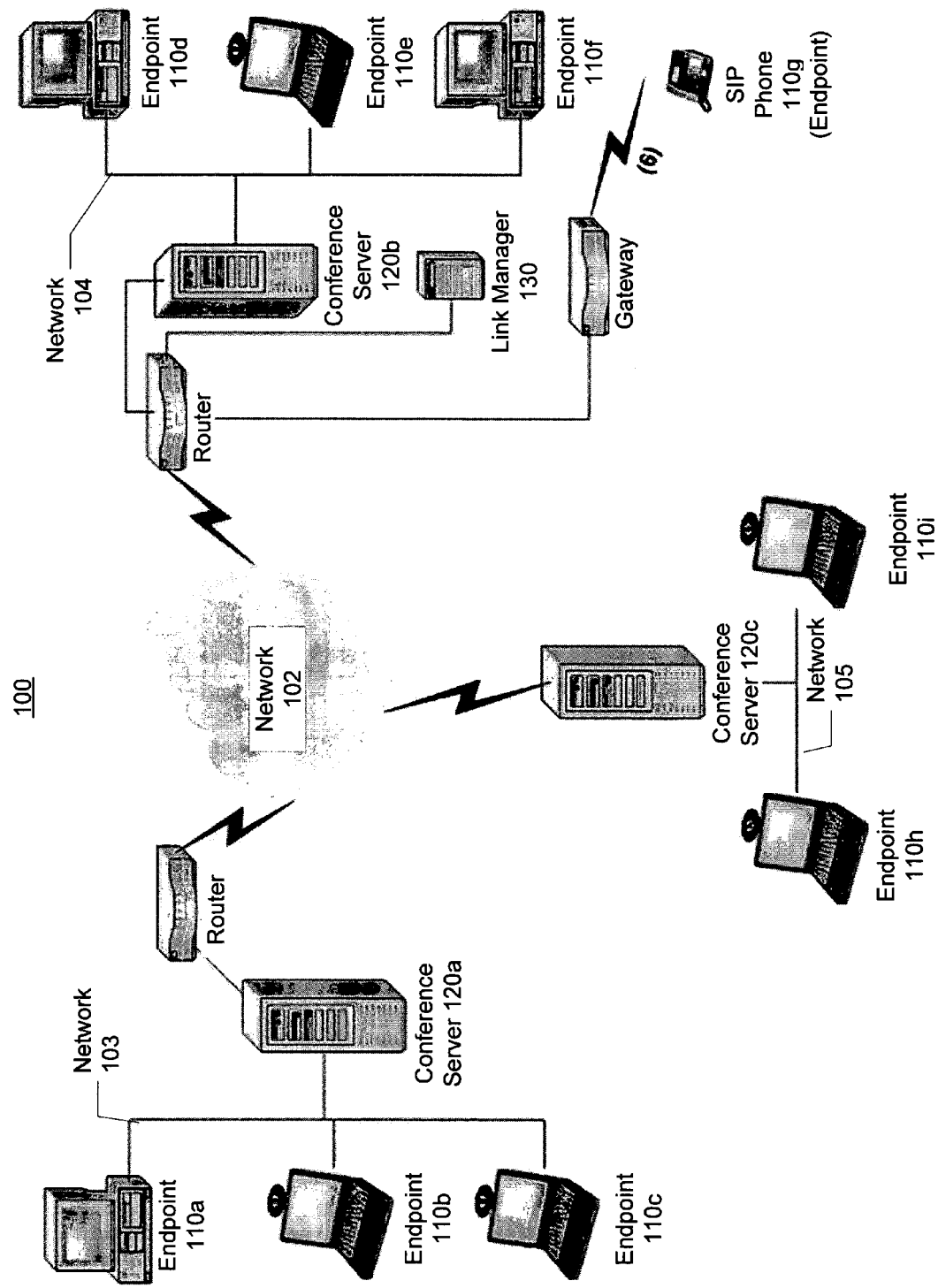
FIG. 1 depicts an example multipoint conferencing system according to one embodiment of the invention.

FIG. 1 depicts an example multipoint conferencing system 100 according to one embodiment of the invention. The network 102 may be a local area network, a wide area network, or the Internet. FIG. 1 further depicts multiple conference servers 120a-120c and a link manager 130. FIG. 1 also depicts multiple conference endpoints coupled to the conference servers. In FIG. 1, the components of the example multipoint conferencing system are depicted as standalone components. However, it should be noted that functionalities of some of the components of the example multipoint conference system, such as those of Link Manager 130 and the conference server 120b, may be provided by a single software component. Furthermore, although some of the components are shown as being implemented on separate machines, it should be understood that they can be implemented on a single computer device.

According to one embodiment of the invention, each conference endpoint has a "local" conference server. For example, as shown in FIG. 1, conference server 120a is coupled to endpoints 110a-110c via a network 103 and acts as their local conference server. Likewise, conference server 120b is coupled to endpoints 110d-110g via a network 104 and acts as their local conference server. Conference server 120c is coupled to endpoints 110h-110i via a network 105 and acts as their local conference server. Networks 103, 104, 105 may be a local area network, a wide area network, or the Internet. Note that an endpoint does not have to be physically close to its local conference server. A conference server is local as long as the endpoint does not communicate with the conference server via another conference server. Note that a "conference server" does not have to be a single entity. In some embodiments of the invention, a group of conference servers can act as an endpoint's conference server. For example, conference server 120b of FIG. 1 may be consisted of a group of conference servers for handling endpoints 110d-110g. In some embodiments, if all the ports of a conference server are used, support can be rolled over to a main/centralized conference server or a backup conference server of the group.

Multipoint conferences can be held locally or across the network. A local multipoint conference involves one conference server and the endpoints connected thereto. For example, conference server 120a can host a "local" multipoint conferences involving endpoints 110a-110c. A distributed multipoint conference involves more than one conference server across the network. For example, conference server 120b and conference server 120c can jointly host a distributed multipoint conference involving endpoints 110d-110f and endpoints 110h-110i.

Each conference server is aware of which video streams are viewed by the participants connected to that server. Thus, when hosting local conferences involving local endpoints only, the conference server does not send video and audio streams from the endpoints across the network 102. The local conference server mixes the video and audio streams and distributes the data locally to the participating endpoints. When hosting distributed conferences involving endpoints across the network, the conference server provides video and audio streams to other conference servers, which distribute the video and audio streams to participating endpoints connected thereto. Multiple copies of the same data stream are not sent directly to the participating endpoints across the network 102, thus conserving network bandwidth.

With reference still to FIG. 1, there is shown a Link Manager 130 coupled to the network 102. According to one embodiment of the invention, the Link Manager manages communication links between the conference servers. Specifically, the Link Manager is aware which endpoints are connected to which conference servers and sets up communication links between two conference servers if one or more endpoints connected to one server are receiving video/audio information from one or more endpoints connected to the other server. The conference servers themselves keep track of which video streams are being viewed by the participants connected to each conference server. If no one across the network happens to be viewing a particular participant's video image, the conference server will stop providing the stream to the network, thus conserving network bandwidth. In one embodiment, the conference server may terminate a link to another conference server if the link is no longer in use by any active conferences.

In one embodiment, the Link Manager is responsible for determining the type of links between the conference servers. Under some circumstances, the Link Manager may establish a Unicast link between two conference servers. Under some other circumstances, the Link Manager may establish a Multicast link between two or more conferences. Generally, whether a Unicast link or Multicast link is created depends on the bandwidth availability and usage, as well as the number of conference servers and endpoints involved.

In addition to managing links between conference servers, the Link Manager manages which conference endpoints are served by which conference servers. Before an endpoint connects to any one of the conference servers, it first connects to the Link Manager. The Link Manager determines an Endpoint ID of the endpoint and uses the Endpoint ID to select one of the conference servers as the endpoint's local server. In one embodiment, the Link Manager has stored therein a list of Endpoint ID ranges (e.g., IP address ranges, E164 prefixes, domain names, H.323 aliases, etc.) which are associated with the conference servers. The Link Manager compares the Endpoint ID of the endpoint to the list of Endpoint ID ranges and determines which Endpoint ID range the endpoint falls within. If the endpoint falls within one Endpoint ID range, the Link Manager will create a communication link between the corresponding conference server and the endpoint. If the endpoint falls within more than one Endpoint ID range, the Link Manager will choose the smallest Endpoint ID range and will create a communication link between the chosen conference server and the endpoint. If the endpoint does not fall within any Endpoint ID range, the Link Manager may disallow the connection, for security purposes.

In one embodiment, the Link Manager uses the endpoint's E164 address, or telephone number, to select one of the conference servers as the endpoint's local server. The Link Server has stored therein a list of E164 Prefixes that are associated with conference servers. The Link Manager compares the E164 address of the endpoint to the list of E164 Prefixes, and determines which Prefix best matches. If more than one Prefix matches, then the Link Manager will choose the longest matching Prefix (e.g. if the endpoint's E164 is 4085555555, then the prefix "408" is a better match than "4"). The Linking Manager can also do digit replacement after the match is made, in order to normalize the number for use by a Gateway or Dial-out service (e.g. replace "408" with "1408" to dial out of a PBX). If the endpoint's E164 does not match any E164 Prefix, then the Link Manager will disallow the connection for security purposes.

In yet another embodiment, the Link Manager uses an H.323 alias (e.g., email-ID, URL ID, H.323-ID) as the Endpoint ID. In that embodiment, a list of H.323 alias values associated with each conference server. The Link Manager then compares the Endpoint ID of an incoming endpoint to the list and selects a most suitable conference server for the endpoint.

In one embodiment, the Link Manager establishes a communication link between an endpoint and a conference server by sending control signals to both. The control signals can include a command message, the endpoint's Endpoint ID, the conference server's address, and/or the phone number of the endpoint.

Figure 2:
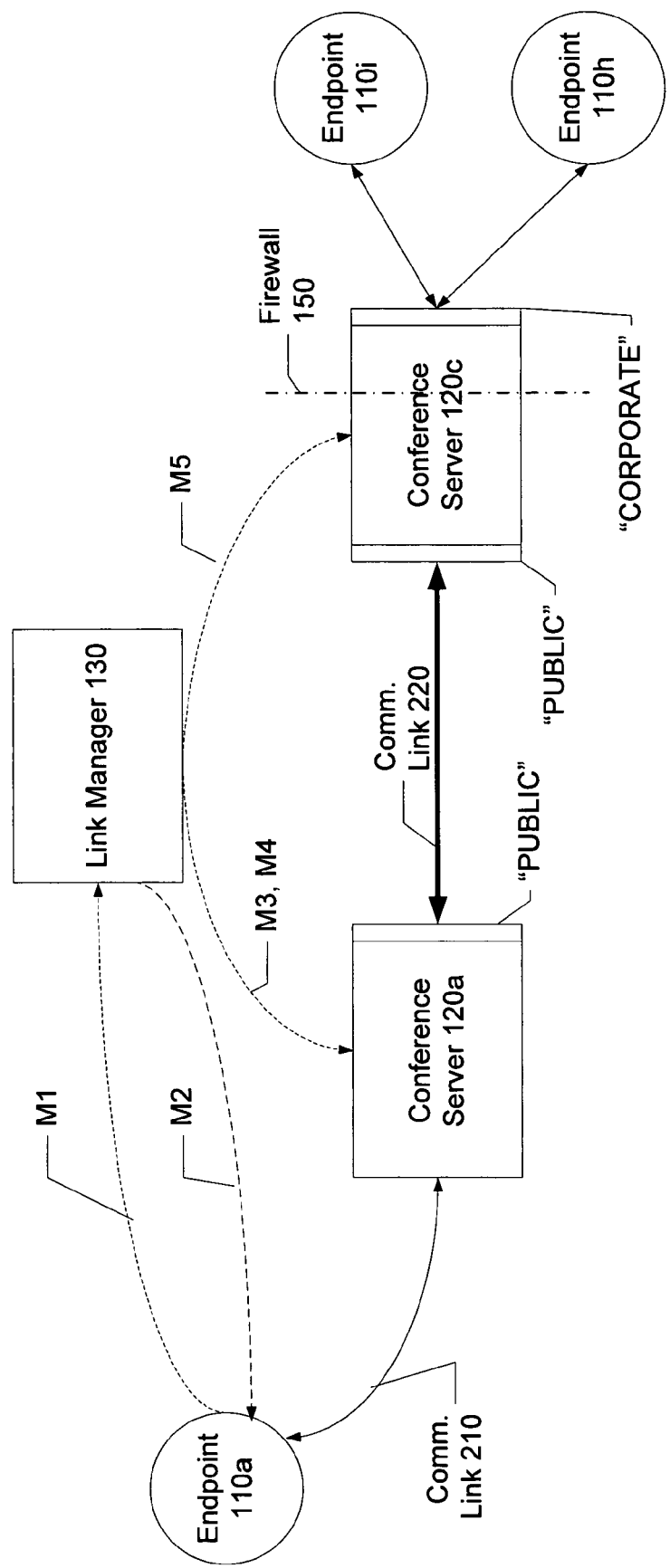
FIG. 2 depicts a typical message sequence carried out by the multipoint conferencing system when selecting a suitable conference server for an endpoint, in accordance with an embodiment of the invention.

The manner in which the Link Manager 130 selects a suitable conference server for an endpoint will vary from implementation to implementation, but FIG. 2 illustrates a typical message sequence for carrying out such a function. Message M1 represents the message from endpoint 110a to the Link Manager, which recognizes this message as a request for the allocation of a suitable conference server. In response to the request, the Link Manager obtains the Endpoint ID of the endpoint. The Endpoint ID can be included in the request itself, or can be obtained from the message headers.

According to one embodiment, the Link Manager has stored therein predetermined Endpoint ID ranges (e.g., IP address ranges and E164 prefixes) associated with the conference servers. For example, conference server 120a may be associated with the IP address range 10.0.0.0 to 10.255.255.255 and E164 prefixes 415 and 510. Conference server 120b may be associated with the IP address range 10.20.0.0 to 125.255.0.0 and E164 prefixes 617 and 212 while conference server 120c may be associated with the IP address range 192.0.0.0 to 255.255.255.255 and E164 prefixes 852 and other prefixes. These IP address ranges, E164 prefixes and the associated conference server identifiers are stored in a look up table of the Link Manager, an example of which is shown in FIG. 3. Typically, the IP address ranges correspond to the geographical location of the network. For example, conference server A (ConfServA), which is associated with the IP address range 10.0.0.0 to 10.255.255.255 may be physically located in the United States, while conference server B (ConfServB), which is associated with IP address ranges 10.20.0.0 to 125.255.0.0, may be physically located in Europe. In other examples, the IP address ranges may correspond to the organizational structure of the company within which the multipoint conferencing system is deployed. Similar configurations and tables may be formed by using other Endpoint IDs, in addition to or in place of IP addresses and E164 addresses.

In the example shown in FIG. 3, the predetermined Endpoint ID ranges are not mutually exclusive. Some Endpoint ID ranges may overlap. For instance, the IP address ranges for ConfServA and ConfServB overlap. If an endpoint falls within the overlapped IP address range, the Link Manager may choose either one of conference servers. Preferably, the Link Manager will choose the conference server that is associated with a smaller or narrower Endpoint ID range. In some embodiments, the Endpoint ID ranges are mutually exclusive. In some embodiments, each conference server may be associated with one or more Endpoint ID ranges.

After obtaining the Endpoint ID of the endpoint from the message M1, the Link Manager executes a procedural call to compare the Endpoint ID to the predetermined Endpoint ID ranges and to determine which Endpoint ID ranges the endpoint falls within. If the endpoint's Endpoint ID falls within one Endpoint ID range, the Link Manager will assign the endpoint to the corresponding conference server. If the endpoint's Endpoint ID falls within multiple overlapping Endpoint ID ranges, the Link Manager will assign the endpoint to the conference server whose Endpoint ID range is the narrowest among the overlapping Endpoint ID ranges. If the endpoint's Endpoint ID falls outside of any Endpoint ID ranges, the Link Manager may disallow the endpoint into the conference, for security purposes.

According to another embodiment, the most suitable conference server for an endpoint is determined by "pinging" each of the conference servers, and the one with the lowest ping times is selected as the endpoint's local conference server. In yet another embodiment, the most suitable conference server for an endpoint is determined by counting a number of hops between the conference endpoint and the conference servers, and the one with the fewest hops is selected. In those embodiments, the methods employed may be somewhat time-consuming. Thus, the most suitable conference server may not be re-assigned every time an endpoint connects to the multipoint conferencing system. In some embodiments of the invention, a conference endpoint's default conference server is determined using the methods discussed upon user request, or upon detection of unusually slow and choppy video and audio streams. In some embodiments, a conference endpoint's default conference server is determined periodically using the methods discussed.

In other embodiments of the invention, the "most suitable" conference servers can be chosen by many other different techniques and criteria. For example, the "most suitable" conference server may be chosen to match the features supported by the conference endpoint. This criterion is particularly useful when the conference servers deployed within the network do not support the same features. Some of the conference servers may be more feature-rich, while some conference servers are bare bone systems. In that embodiment, if the endpoint itself does not support more advanced conferencing features, the Link Manager will assign it to a less feature-rich conference server. Similarly, the "most suitable" conference servers can be chosen by connection speed, network load, and/or other factors.

In yet another embodiment, the "most suitable" conference server may be chosen based on network topology. For example, endpoints behind a firewall should be assigned conference servers that are behind the same firewall. Assigning endpoints behind a firewall to a conference server can be achieved simply by noting the IP address ranges behind the firewall and associating the IP address ranges to the conference server.

With reference again to FIG. 2, the Link Manager responds to the request message M1 by sending the address of the selected conference server to the endpoint 110a. This step is designated in the drawing as message M2. Upon receiving the message M2, the endpoint 110a establishes a connection to the selected conference server by executing a procedure call that the endpoint has been programmed to perform. The communication link between the endpoint 110a and the conference server 120a is depicted in FIG. 2 as communication link 210.

The endpoint may be compliant with the H.323 standard. In that event, the Link Manager responds to the request message M1 by sending the Endpoint ID of the endpoint 110a to the selected conference server. This step is designated in the drawing as message M3. The selected conference server upon receiving the message M3 calls out to the endpoint 110a by executing a procedure call that the conference server has been programmed to perform. It is noted that the other endpoints (e.g., endpoints 110h and 110i) may follow the same procedures as outlined above with respect to endpoint 110a to register with a suitable conference server.

With reference still to FIG. 2, after assigning the endpoint 110a to the appropriate conference server, the Link Manager then executes a procedure call that determines whether the endpoint 110a is participating in a multipoint conference that involves endpoints not connected to the same conference server. If so, the Link Manager sets up communication links through which conference data is transmitted.

By way of example, suppose endpoint 110a, endpoint 110h and endpoint 110i of FIG. 2 are participating in the same conference. In this example, since endpoint 110a and endpoints 110h-110i are connected to separate conference servers, the Link Manager executes a procedural call to send messages M4 and M5 to conference servers 120a and 120c, respectively. The conference servers 120a and 120c, upon receiving the messages, executes procedural calls to establish communication link 220. Video, data and audio streams from endpoint 110a are first transmitted to conference server 120a, which in turn transmits the data streams to the conference server 120c via the communication link 220. At conference server 120c, the video, data and audio streams are duplicated into two copies to be distributed to endpoints 110h and 110i. Video, data and audio streams from endpoint 110h are first transmitted to the conference server 120c, which in turn transmits the media streams to the conference server 120a and the endpoint 110i. Likewise, video, data and audio streams from endpoint 110i are transmitted to conference server 120a and endpoint 110h. Note that, in one embodiment, the conference server 120c does not combine the video streams from endpoints 110h and 110i before sending them to conference server 120a. Rather, the video streams are sent as separate data streams to conference server 120a, at which point the video streams and audio streams from different endpoints are distributed to the endpoint 110a. Note that, in one embodiment, video is not mixed, per se. Video streams are sent individually to the client, although they may be sent on the same IP connection socket.

In one embodiment, the Link Manager uses a table to keep track of which endpoint is connected to which server, and which endpoint data stream should be sent to which endpoints. In particular, in one embodiment, the Link Manager keeps a table of Conference Identifiers (Conference IDs), and which conference servers are already linked into them. If an endpoint joins a particular conference, the Link Manager looks for the most appropriate conference server (e.g., by determining whether the IP address of the conference endpoint falls within the IP address ranges of a conference server), then the Link Manager determines if that particular conference server is already linked to the conference. If so, the endpoint is linked to that conference server. If not, a communication link is established between the conference server and another participating conference server. Thereafter, the Link Manager adds in the endpoint to the conference on the conference server. An example table that stores Conference IDs in conjunction with Conference Server IDs is shown in FIG. 4.

Attention now turns to another aspect of the invention. As described above, the Link Manager manages communication links between the conference servers. Specifically, the Link Manager is aware which conference servers have more than one network interface, and whether there is a firewall separating them. If a communication link is established with the wrong interface, conferencing data can be lost and significant network resources may be wasted in routing the data through the firewall.

According to one embodiment of the invention, if a conference server has more than one network interface, the Link Manager 130 will choose a more appropriate network interface with which communication links are established. In one embodiment, each network interface of the Conference Server is given a name. For example, in FIG. 2, the network interface behind a firewall 150 is labeled "CORPORATE" and the interface facing the outside network is labeled "PUBLIC." Also note that the network interface of Conference Server 120a is also labeled "PUBLIC." According to one embodiment of the invention, if there is more than one interface available, the Link Manager compares the interfaces' names before establishing a communication link between two conference servers. If there is a match, a communication link is established between the matching interfaces. If there is not a match, a communication link is established nonetheless with one of the network interfaces.

According to one embodiment of the invention, endpoints are assigned to the appropriate interfaces according to the Endpoint IDs. For example, each interface of a conference server may be associated with a range of IP addresses. In particular, an interface behind a firewall may be associated with a range of IP addresses that are known to be behind the firewall. In this event, when the Link Manager establishes communication links between the conference server and endpoints behind the firewall, the endpoints will connect with the appropriate interface of the conference server.

Figure 5:
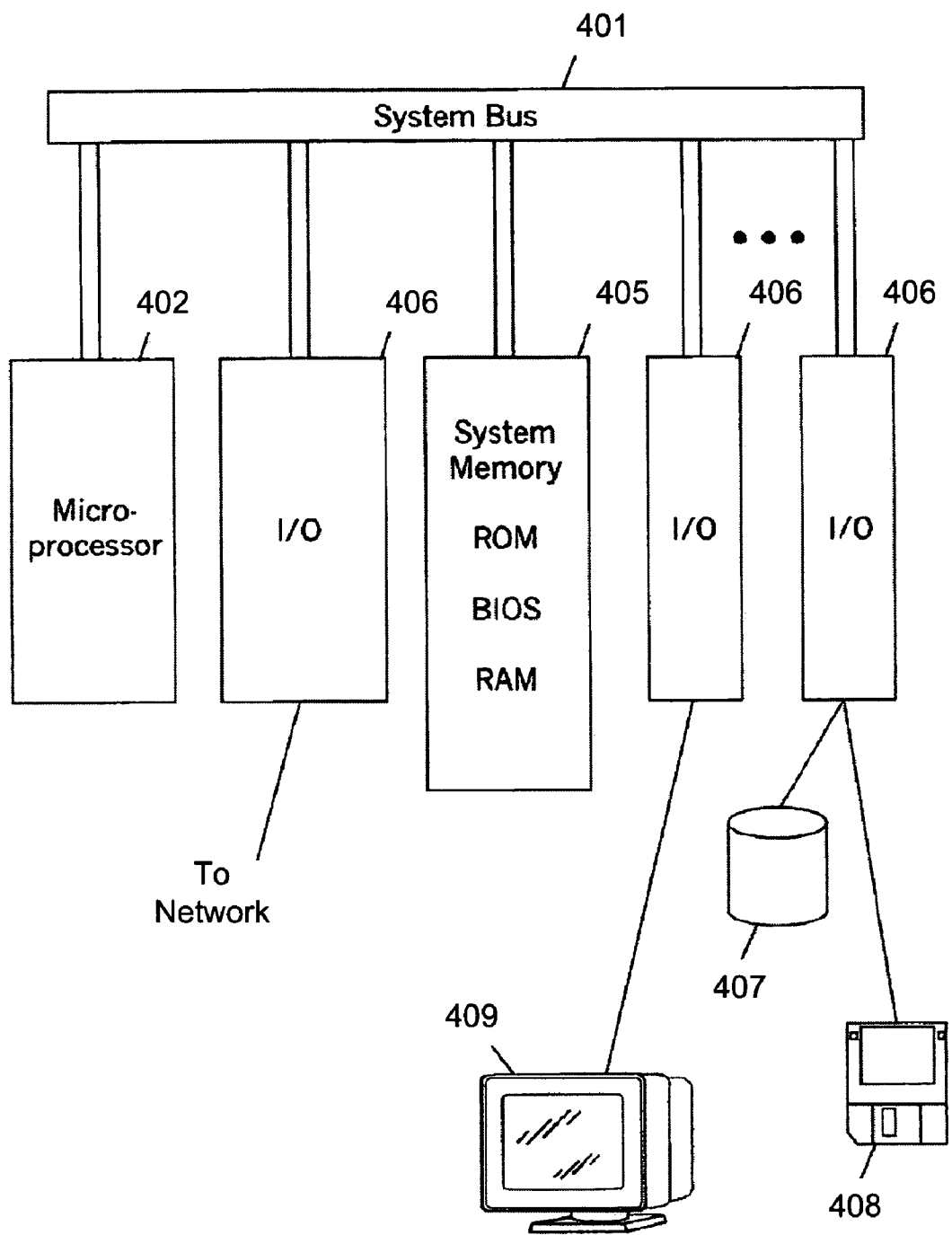
FIG. 5 depicts an example computer system in which an embodiment invention can be implemented.

The invention can be implemented through computer program operating on a programmable computer system or instruction execution system such as a personal computer or workstation, or other microprocessor-based platform. FIG. 5 illustrates details of a computer system that is implementing the invention. System bus 401 interconnects the major components. The system is controlled by microprocessor 402, which serves as the central processing unit (CPU) for the system. System memory 405 is typically divided into multiple types of memory or memory areas such as read-only memory (ROM), random-access memory (RAM) and others. The system memory may also contain a basic input/output system (BIOS). A plurality of general input/output (I/O) adapters or devices 406 are present. Only three are shown for clarity. These connect to various devices including a fixed disk drive 407 a diskette drive 408, network 410, and a display 409. Computer program code instructions for implementing the functions of the invention are stored on the fixed disk 407. When the system is operating, the instructions are partially loaded into memory 405 and executed by microprocessor 402. Optionally, one of the I/O devices is a network adapter or modem for connection to a network, which may be the Internet. It should be noted that the system of FIG. 5 is meant as an illustrative example only. Numerous types of general-purpose computer systems are available and can be used. When equipped with an image capturing device, a microphone and a speaker, the computer system may be used to implement a conference endpoint.

Elements of the invention may be embodied in hardware and/or software as a computer program code (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system such as the one shown in FIG. 5. A computer-usable or computer-readable medium may be any medium that can contain, store, communicate, or transport the program for use by or in connection with an instruction execution system. The computer-usable or computer-readable medium can be, for example, an electronic, magnetic, optical, electromagnetic, infrared, or semiconductor system. The medium may also be simply a stream of information being retrieved when the computer program product is "downloaded" through a network such as the Internet. Note that the computer-usable or computer-readable medium could even be paper or another suitable medium upon which a program is printed.

Finally, although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first.

What is claimed is:

1. A multipoint conferencing system for use in a computer network, comprising:
    a plurality of conference servers coupled to the network, wherein one or more of the plurality of conference servers are distributed across the network;
    a plurality of conference endpoints coupled to the network, wherein one or more of the plurality of conference endpoints are distributed across the network; and
    a link manager coupled to the network, wherein the link manager is configured to selectively assign a first one of the conference servers to a first plurality of the plurality of conference endpoints and a second one of the conference servers to a second plurality of the plurality of conference endpoints, to communicate at least first control signals to the selectively assigned conference servers to establish first communication links between the selectively assigned conference servers and the conference endpoints, and to communicate second control signals to the selectively assigned conference servers to establish second communication links among the selectively assigned conference servers through which the first plurality and the second plurality of conference endpoints participating in a same multipoint conference communicate, wherein the second control signals comprise one or more commands to the assigned conference servers to transmit separate media streams from each of the first plurality and the second plurality of conference endpoints and, in response to receiving the separate media streams for each of the first plurality and the second plurality of conference endpoints, at least one of mix, manage, and redistribute the received separate media streams at each assigned conference server.

2. The multipoint conferencing system of claim 1, wherein at least one of the conference servers has a first interface that is behind a firewall and a second interface that is in front of the firewall.

3. The multipoint conferencing system of claim 2, wherein link manager is configured to automatically establish a first communication link between one of the first interface and the second interface and the conference endpoint according to at least in part a location of the conference endpoint relative to the firewall.

4. The multipoint conferencing system of claim 2, wherein the link manager is configured to automatically establish a second communication link between one of the first interface and the second interface and another one of the conference servers according to at least in part a location of the second conference server relative to the firewall.

5. The multipoint conferencing system of claim 1, wherein the link manager is configured to detect at least an endpoint identification of the conference endpoints.

6. The multipoint conferencing system of claim 1, wherein the link manager is configured to selectively assign the first and second conference servers to the first and second conference endpoints according to endpoint identifications of the conference endpoints.

7. The multipoint conferencing system of claim 1, wherein the link manager is configured to compare endpoint identifications to a plurality of pre-determined sets of endpoint identification values, wherein each set is associated with at least one of the plurality of conference servers.

8. The multipoint conferencing system of claim 7, wherein one set of the pre-determined endpoint identification values correspond to addresses of a first network, and wherein another set of pre-determined identification values correspond to addresses of a second network.

9. The multipoint conferencing system of claim 8, wherein the first network and the second network are separated by a firewall.

10. The multipoint conferencing system of claim 8, wherein the endpoint identifications comprise IP addresses and wherein each set of endpoint identification values comprise a pre-determined IP address range.

11. The multipoint conferencing system of claim 8, wherein the endpoint identifications comprise E164 addresses and wherein each set of endpoint identification values comprises a pre-determined E164 prefix.

12. A multipoint conferencing system, comprising:
    a plurality of conference servers each having a network interface for coupling to a computer network, wherein one or more of the plurality of conference servers are distributed across the computer network; and
    a link manager having a network interface for coupling to the computer network, wherein the link manager is configured to receive a request from a conference endpoint to join a multipoint conference, wherein the link manager is configured to select one of the plurality of conference servers for the conference endpoint in response to the request even if an endpoint identification of the endpoint is unknown the multipoint conference system prior to receiving the request, and wherein the link manager is configured to instruct the selected conference server to transmit separate media streams for the conference endpoint and, in response to receiving separate media streams from the conference endpoint and a plurality conference endpoints participating in the multipoint conference, at least one of mix, manage, and redistribute the received separate media streams at the selected conference server.

13. The multipoint conferencing system of claim 12, wherein the link manager is configured to compare an IP address of the conference endpoint to pre-determined IP address ranges associated with the plurality of conference servers when selecting one of the conference servers for the conference endpoint.

14. The multipoint conferencing system of claim 12, wherein the link manager is configured to compare an E164 address of the conference endpoint to pre-determined E164 prefixes associated with the plurality of conference servers when selecting one of the conference servers for the conference endpoint.

15. The multipoint conferencing system of claim 12, wherein at least one of the conference servers has a first interface that is behind a firewall and a second interface that is in front of the firewall.

16. The multipoint conferencing system of claim 15, wherein the link manager is configured to automatically establish a communication link between one of the first interface and the second interface and the conference endpoint according to at least in part a location of the conference endpoint relative to the firewall.

17. The multipoint conferencing system of claim 12, wherein the link manager is configured to establish communication links among at least two of the conference servers through which conference endpoints communicate.

18. The multipoint conferencing system of claim 12, wherein the link manager is configured to establish communication links among at least two of the conference server through which conference endpoints communicate.

19. The multipoint conferencing system of claim 18, wherein at least one of the conference servers has a first interface that is behind a firewall and a second interface that is in front of the firewall, and wherein link manager is configured to automatically establish a communication link between one of the first interface and the second interface and another one of the conference servers according to at least in part a location of the other one of the conference servers relative to the firewall.

20. A multipoint conferencing system, comprising:
a plurality of conference servers coupled to a network, wherein one or more of the plurality of conference servers are distributed across the network;
a plurality of conference endpoints coupled to different ones of the conference servers via the network, wherein one or more of the plurality of conference endpoints are distributed across the network; and
a link manager coupled to the network, wherein the link manager is configured to set up an impromptu multipoint conference involving the conference endpoints without requiring prior knowledge of an endpoint identification of at least one of the conference endpoints, and wherein the link manager is configured to instruct each of the plurality of conference servers to transmit separate media streams for the conference endpoints involved in the impromptu multipoint conference and, in response to receiving the separate media streams from the conference endpoints involved in the impromptu multipoint conference, at least one of mix, manage, and redistribute the received separate media streams at each of the plurality of conference servers.

21. The multipoint conferencing system of claim 20, wherein the impromptu multipoint conference is collectively hosted by more than one of the conference servers.

22. The multipoint conferencing system of claim 20, wherein the link manager manages communication links between the conference endpoints and the conference servers.

23. The multipoint conferencing system of claim 22, wherein the link manager manages communication links between at least two of the conference servers through which at least two conference endpoints of a same multipoint conference communicate.

24. The multipoint conferencing system of claim 20, wherein the link manager is configured to detect endpoint identifications of the conference endpoints.

25. The multipoint conferencing system of claim 24, wherein the link manager is configured to selectively assign the conference servers to the conference endpoints according to at least in part the endpoint identifications.

26. A method of setting up an impromptu multipoint conference in a multipoint conferencing system that has a plurality of conference servers, wherein one or more of the plurality of conference servers are distributed across the network, comprising:
receiving a request to participate in a multipoint conference from a conference endpoint, wherein one or more participating conference endpoints are served by a first one of the conference servers, the one or more participating conference endpoints being distributed across the network;
in response to at least in part information carried by the request, communicating at least a first control signal to a second one of the conference servers to establish a server-endpoint relationship between the conference endpoint and the second conference server; and
communicating at least a second control signal to the first conference server and the second conference server to establish a communication link between the conference servers through which data captured at the conference endpoint is sent to the one or more participating endpoints, wherein the second control signal comprises one or more commands to the second conference server to transmit separate media streams for the conference endpoint and the participating conference endpoints with the server-endpoint relationship and, in response to receiving the separate media streams from each of the participating conference endpoints, at least one of mix, manage, and redistribute the received separate media streams at the second conference server.

27. The method of claim 26, wherein the information carried by the request comprises an IP address of the conference endpoint.

28. The method of claim 27, comprising comparing the IP address to pre-determined IP address ranges associated with the plurality of conference servers.

29. The method of claim 26, wherein the information carried by the request comprises an E164 address of the conference endpoint.

30. The method of claim 29, comprising comparing the E164 address to pre- determined E164 prefixes associated with the plurality of conference servers.

31. A link manager for a multipoint conferencing system, comprising:
means for receiving a request to participate in a multipoint conference from a conference endpoint, wherein one or more conference endpoints being distributed across the network, the one or more conference endpoints participating in the multipoint conference are served by a first one of the conference servers, one or more of the conference servers being distributed across the network;

means for communicating, in response to at least in part information carried by the request, at least a first control signal to a second one of the conference servers to establish a server-endpoint relationship between the conference endpoint and the second conference server; and means for communicating at least a second control signal to the first conference server and the second conference server to establish a communication link between the conference servers through which data captured at the conference endpoint is sent to the one or more participating endpoints, wherein the second control signal comprises one or more commands to the second conference server to transmit separate media streams for the conference endpoint and the participating conference endpoints with the server-endpoint relationship and, in response to receiving the separate media streams from each of the participating conference endpoints, at least one of mix, manage, and redistribute the received separate media streams at the second conference server.

32. The link manager of claim 31, comprising means for detecting an IP address of the conference endpoint.

33. The link manager of claim 32, comprising means for comparing the IP address to pre-determined IP address ranges associated with the plurality of conference servers.

34. The link manager of claim 31, comprising means for detecting an E164 address of the conference endpoint.

35. The link manager of claim 34, comprising means for comparing the E164 address to pre-determined E164 prefixes associated with the plurality of conference servers.

36. A computer program product for use in conjunction with a computer device, the computer program product comprising a computer usable storage medium and a computer program mechanism embodied therein that, upon execution by the computer device, enables the computer device to perform a method of setting up impromptu multipoint conferences hosted by a plurality of conference servers, the method comprising:

receiving a request to participate in a multipoint conference from a conference endpoint, wherein one or more participating conference endpoints are served by a first one of the conference servers, the one or more participating conference endpoints being distributed across the network;

in response to at least in part information carried by the request, communicating at least a first control signal to a second one of the conference servers to establish a server-endpoint relationship between the conference endpoint and the second conference server; and communicating at least a second control signal to the first conference server and the second conference server to establish a communication link between the conference servers through which data captured at the conference endpoint is sent to the one or more participating endpoints, wherein the second control signal comprises one or more commands to the second conference server to transmit separate media streams for the conference endpoint and the participating conference endpoints with the server-endpoint relationship and, in response to receiving the separate media streams from each of the participating conference endpoints, at least one of mix, manage, and redistribute the received separate media streams at the second conference server.

37. The computer program product of claim 36, wherein the method further comprises managing communication links between the conference endpoints and the conference servers.

38. The computer program product of claim 36, wherein the method further comprises managing communication links between at least two of the conference servers through which at least two conference endpoints of a same multipoint conference communicate.

39. The computer program product of claim 36, wherein the method further comprises detecting at least an IP address of the conference endpoints.

40. The computer program product of claim 36, wherein the method further comprises establishing communication links between the conference endpoints and the plurality of conference servers according to IP addresses of the conference endpoints.

41. The computer program product of claim 40, wherein the method further comprises comparing IP addresses to a plurality of pre-determined IP address ranges associated with the plurality of conference servers.

42. The computer program product of claim 36, wherein the method further comprises detecting at least an E164 address of the conference endpoints.

43. The computer program product of claim 36, wherein the method further comprises establishing communication links between the conference endpoints and the plurality of conference servers according to E164 addresses of the conference endpoints.

44. The computer program product of claim 43, wherein the method further comprises comparing E164 addresses to a plurality of pre-determined E164 prefixes associated with the plurality of conference servers.

* * * * *